Figure 1:
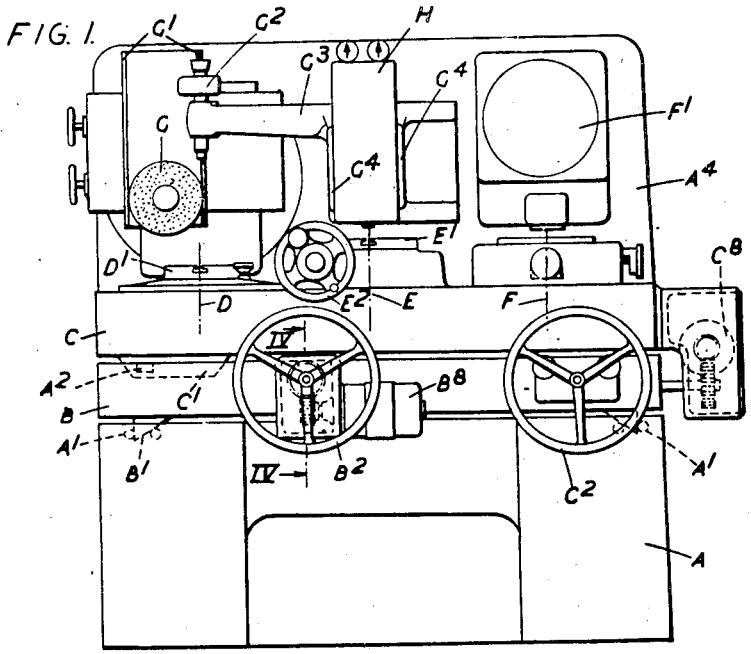

March 15, 1949.  E. A. COOKE ET AL  2,464,293
PHOTOELECTRIC SCANNING DEVICE
FOR COPYING MACHINES Filed March 18, 1947  9 Sheets-Sheet 1

Inventor
Ernest Albert Cooke and
Alan H. Greenhalgh
by Emery, Holcombe + Blair.
Attorneys March 15, 1949.  E. A. COOKE ET AL  2,464,293
PHOTOELECTRIC SCANNING DEVICE
FOR COPYING MACHINES
Filed March 18, 1947 9 Sheets-Sheet 2

Inventor
Ernest Albert Cooke and
Alan H. Greenhalgh
by Emery, Holcombe & Blair
Attorney

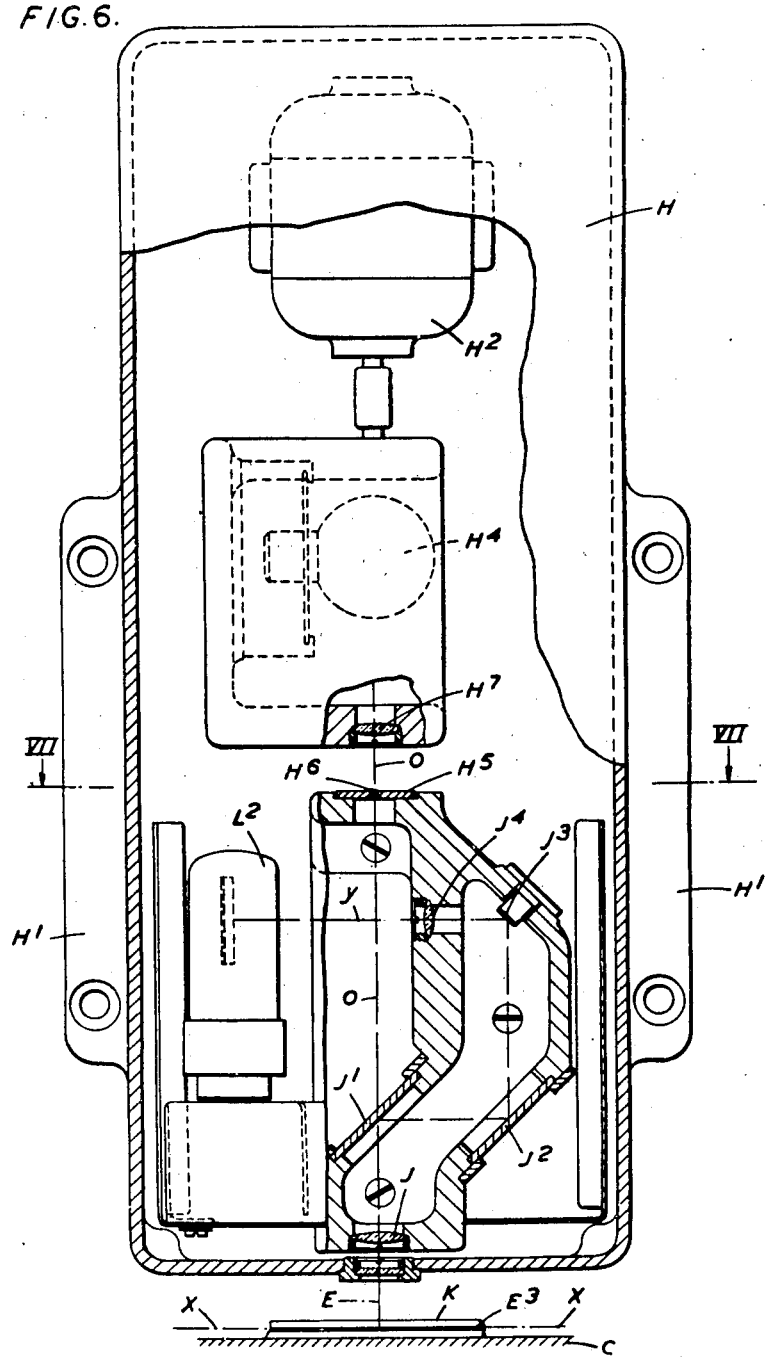

March 15, 1949.  E. A. COOKE ET AL  2,464,293
PHOTOELECTRIC SCANNING DEVICE
FOR COPYING MACHINES
Filed March 18, 1947  9 Sheets-Sheet 4

Inventor
Ernest Albert Cooke
and Alan H. Greenhalgh
by Emery Holcombe & Blair
Attorney March 15, 1949.　　　E. A. COOKE ET AL　　　2,464,293
PHOTOELECTRIC SCANNING DEVICE
FOR COPYING MACHINES Filed March 18, 1947　　　9 Sheets-Sheet 5

Inventor
Ernest Albert Cooke
and Alan H Greenhalgh
By Emery, Holcombe
Attorney

Inventor
Ernest Albert Cooke
and Alan H. Greenhalgh
By Emery, Holcombe & Blair.
Attorney

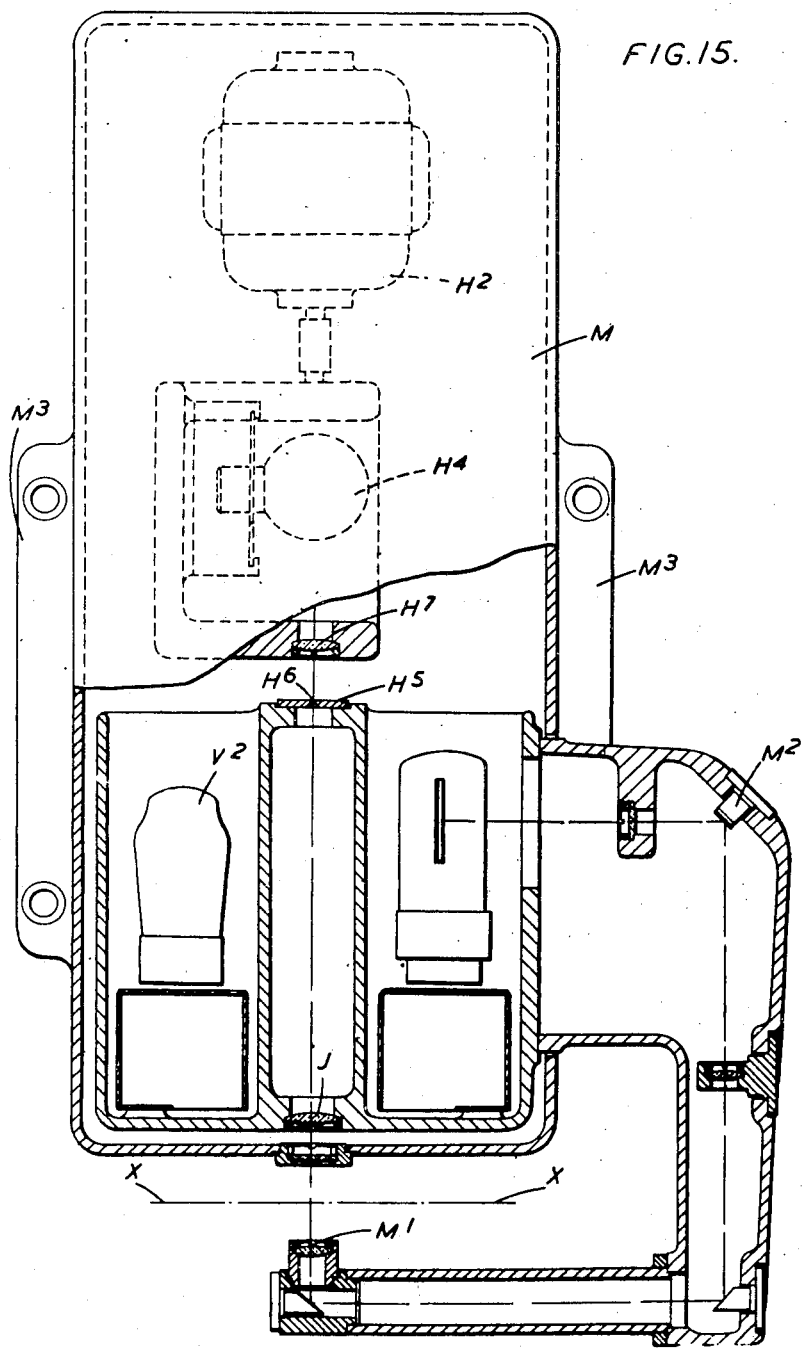

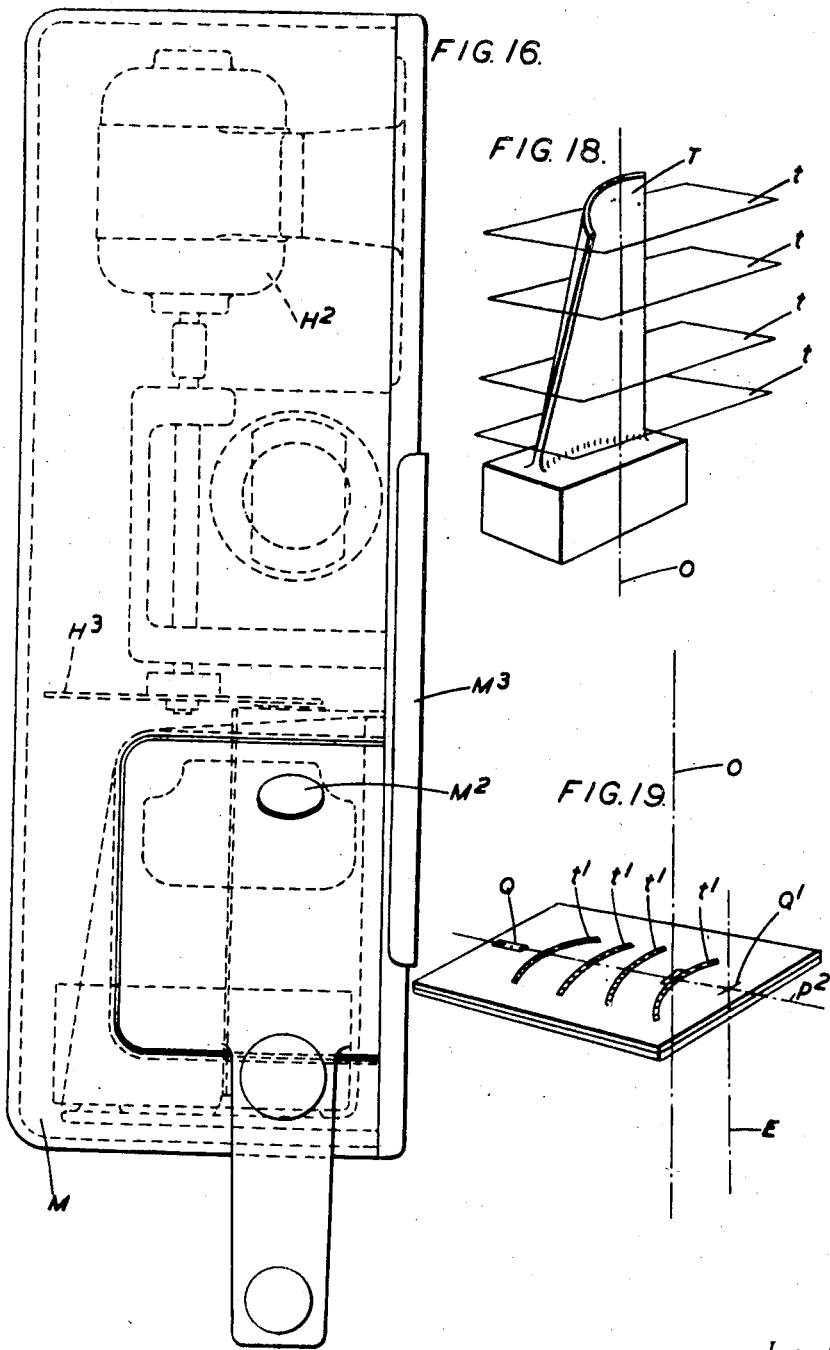

March 15, 1949.  E. A. COOKE ET AL  2,464,293
PHOTOELECTRIC SCANNING DEVICE
FOR COPYING MACHINES
Filed March 18, 1947  9 Sheets-Sheet 9
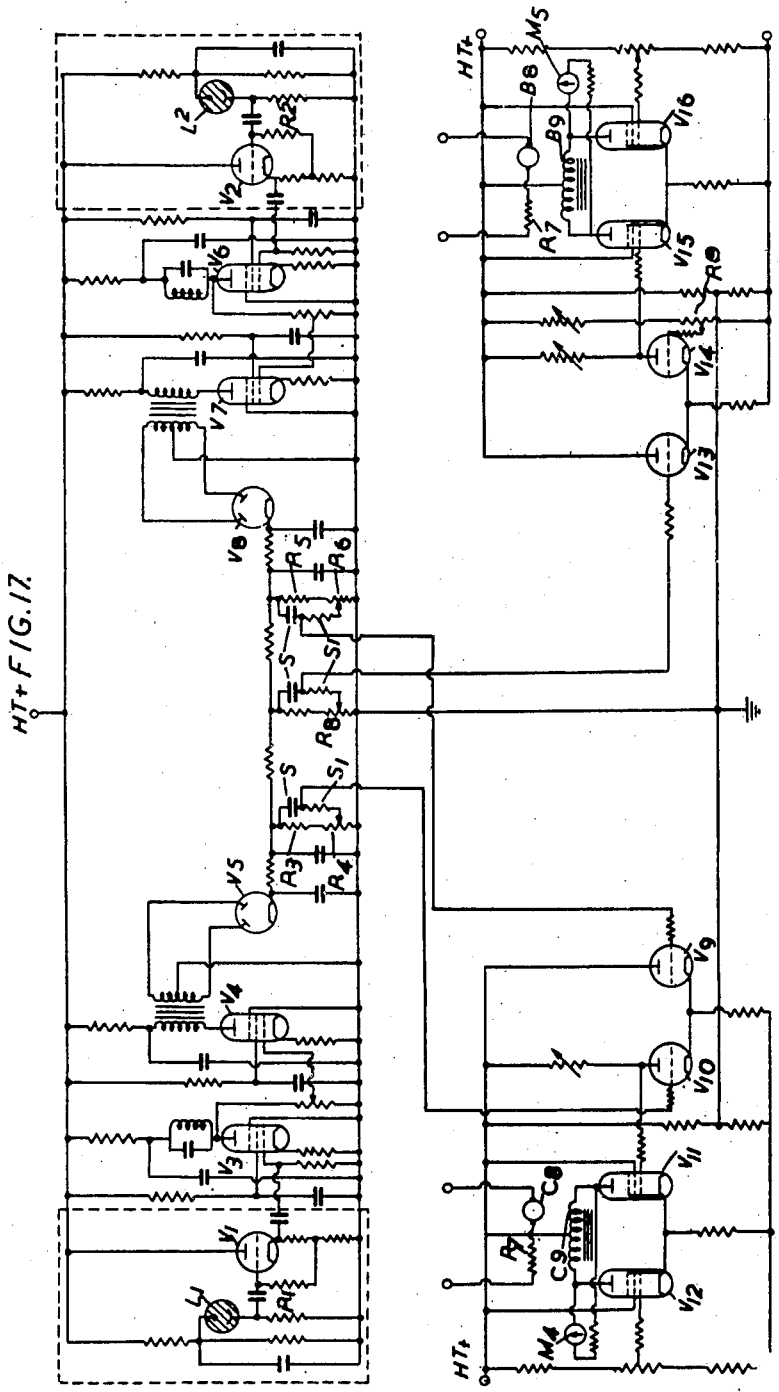
Inventor
Ernest Albert Cooke
and Alan H. Greenhalgh
by Emery, Holcombe + Blair
Attorney Patented Mar. 15, 1949

2,464,293

UNITED STATES PATENT OFFICE 2,464,293

PHOTOELECTRIC SCANNING DEVICE FOR COPYING MACHINES

Ernest Albert Cooke and Alan Henry Greenhalgh, Leicester, England, assignors to Taylor, Taylor & Hobson Limited, Leicester, England, a company of Great Britain Application March 18, 1947, Serial No. 735,344
In Great Britain March 18, 1946

14 Claims. (Cl. 51—100)

This invention relates to photoelectric pick-ups or scanning devices for copying machines of the kind comprising work and copy supports, a support for a tool which is to operate on the work carried by the work support, a support for a tracer, pick-up, or scanning device which follows or scans the outline of the sample, pattern, templet or master profile (hereinafter referred to as the "form") carried by the copy support, and means interconnecting the supports whereby relative movement between the tool and work supports in two coordinate directions is a reproduction of the relative movement between the scanner and copy supports.

In a pick-up or scanning device according to the invention the light from an illuminated area including part of the form to be reproduced is split into two beams incident on two photoelectric cells for controlling the relative movement between the tool and work supports in the two coordinate directions respectively, the energisation of the two cells being thus respectively in accordance with the light derived from two component parts of the single illuminated area. Thus, the form is scanned by a single light beam which is split only after the object plane has been illuminated so that the two directional coordinate controls can be derived from one and the same source of light through one and the same optical system.

In a preferred construction, the scanning device comprises means for illuminating the area including part of the form, and means whereby the two photoelectric cells are energised in accordance with the light derived by transmission or reflection from the two component areas which lie on opposite sides respectively of a plane parallel to one of the coordinate directions. The control thus depends upon the ratio of the quantities of light derived from the two component areas and is therefore substantially "stepless" for all directions of movement of the form.

The invention may be carried into practice in various ways, and may be applied with advantage to any copying machine of the kind set forth above. A scanning unit according to the invention particularly lends itself, however, to use in conjunction with a three-support copying machine as described in the specification of United States of America patent application Serial No. 555,180, which issued as Patent No. 2,460,491, dated February 1, 1949, in the name of one of the present applicants, and, moreover, the scanning unit can be substituted for the mechanical beam pick-up described in the specification of United States of America patent application Serial No. 660,007, which issued as Patent No. 2,441,549, dated May 11, 1948, in the name of one of the present applicants.

Figure 2:
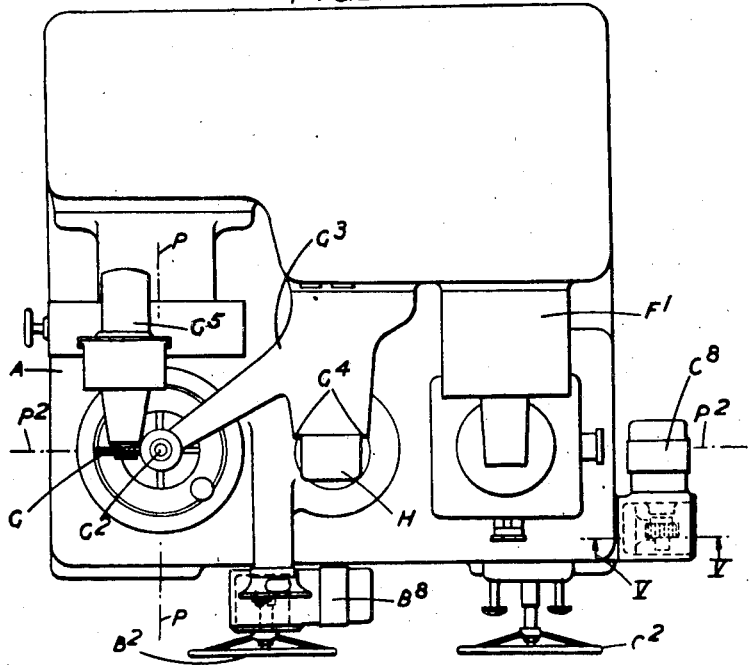
Figure 4:
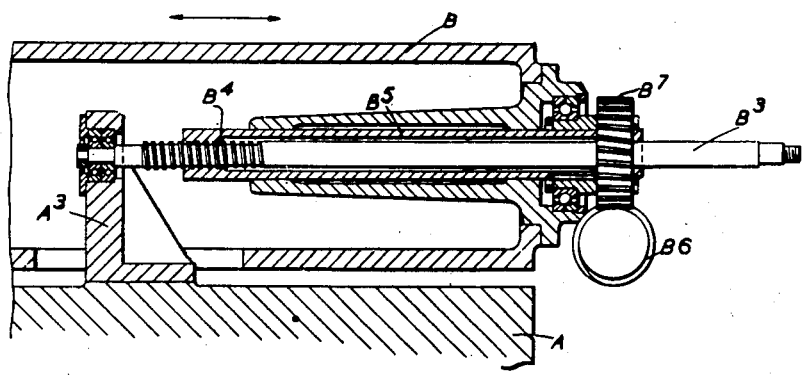
Figure 5:
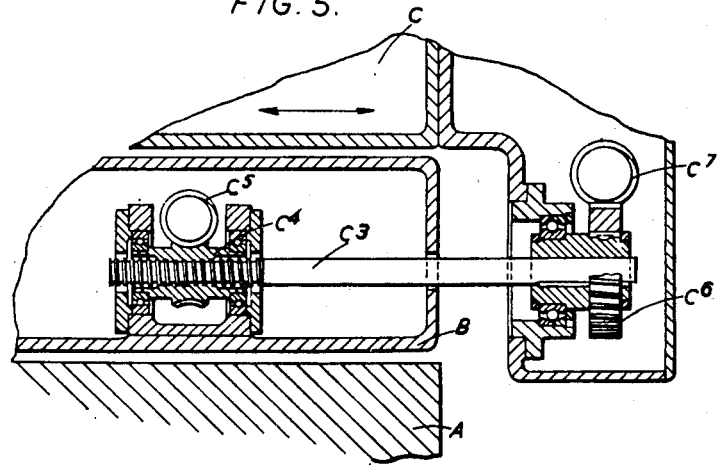
Figure 3:
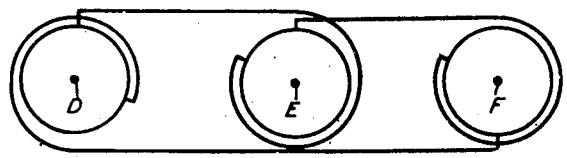
Figure 7:
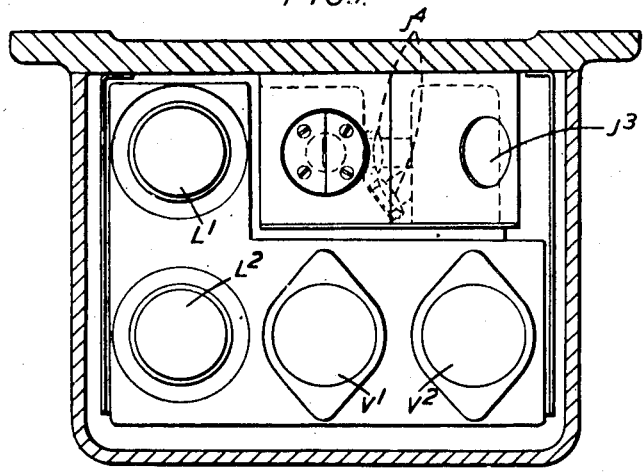
Figure 10:
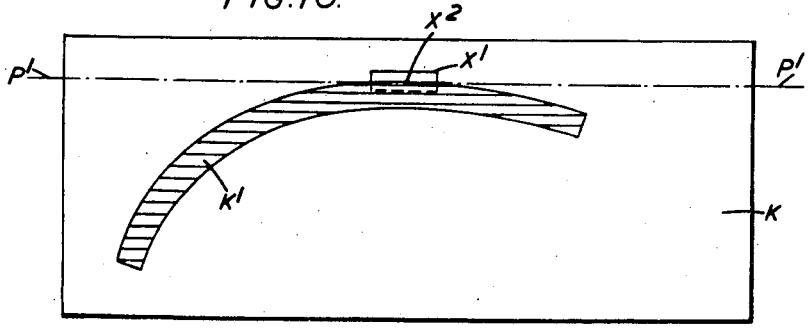
Figure 11:
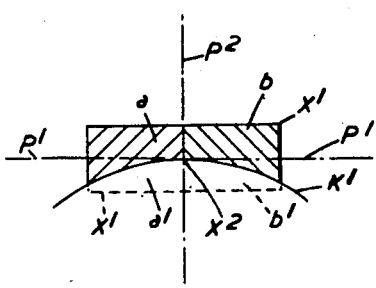
Figure 12:
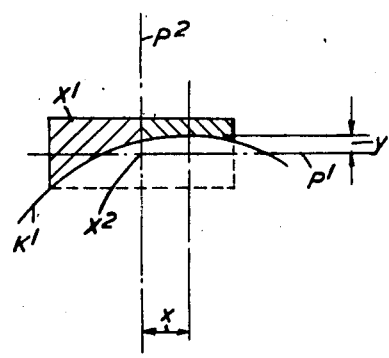
Figure 8:
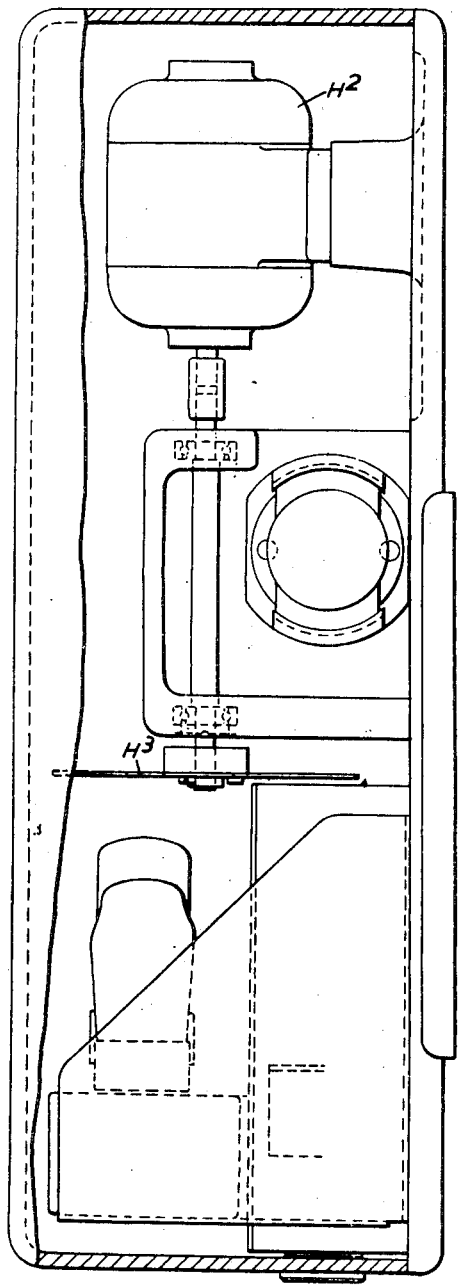
Figure 9:
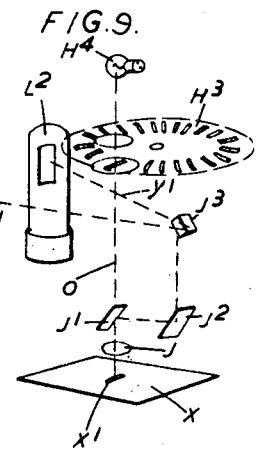
Figure 14:
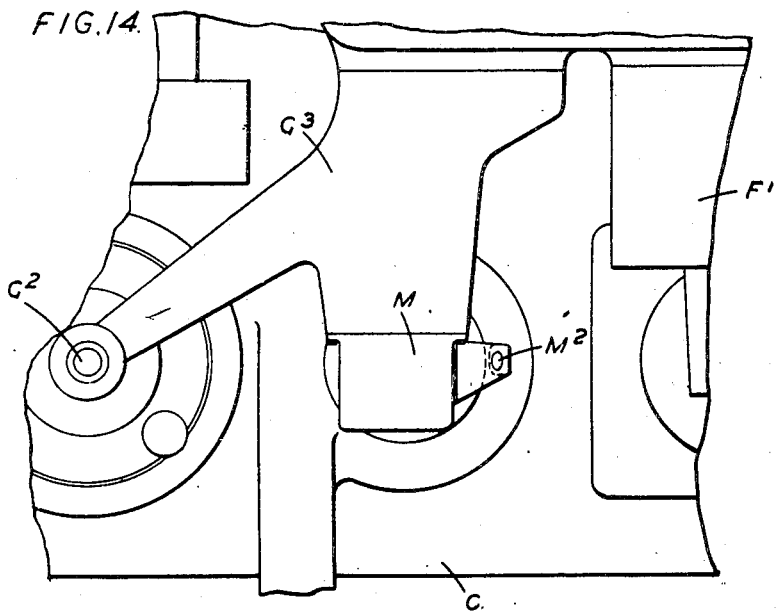
Figure 13:
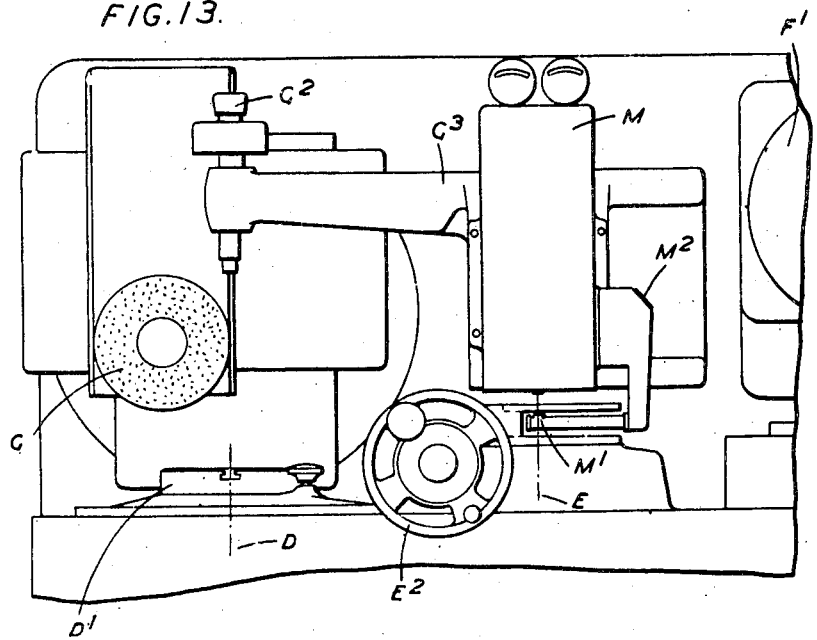

Two arrangements of scanning unit, as applied to such three-support copying machine, are shown diagrammatically in the accompanying drawings, in which Figure 1 is a front elevation of the machine as a whole, Figure 2 shows the machine in plan, Figure 3 is a diagram indicating the manner of interconnection of the three rotary supports of the machine, Figure 4 is a section, on an enlarged scale, on the line IV—IV of Figure 1 showing only the apparatus for traversing the basic slide, Figure 5 is a view, also on an enlarged scale, but on the line V—V of Figure 2 showing only the mechanism for traversing the main carriage, Figure 6 shows one form of scanning attachment in front elevation and with part in vertical section, Figure 7 is a section on the line VII—VII of Figure 6, Figure 8 shows the scanning attachment as viewed from right to left in Figure 6 with the casing cut away, Figure 9 illustrates schematically the parts disposed within the casing of the scanning attachment, Figure 10 is a plan of the transparency bearing the opaque form to be copied, Figures 11 and 12 are diagrams illustrating the manner in which the light transmitted to the photo-cells is varied in accordance with relative displacement between the light beam and the opaque form, Figures 13 and 14 are fragmentary views, generally similar to those of Figures 1 and 2, but having a modified form of scanning attachment, Figure 15 shows, in front elevation and with part cut away, the modified scanning attachment included in Figures 13 and 14.

Figure 16 illustrates the scanning attachment as viewed from right to left in Figure 15, Figure 17 is a wiring diagram of the control circuits through which the two split field motors are controlled from the photo-electric cells, Figure 18 shows a turbine blade which may be produced by the machine from a plurality of opaque forms, and Figure 19 illustrates a transparency bearing a plurality of opaque forms which may be employed successively for producing a turbine blade as shown in Figure 18.

As will be apparent from the two earlier specifications, the grinding wheel may either rotate about a vertical axis and operate on the work in a primary plane extending parallel to the front of the machine, or the grinding wheel may rotate about a horizontal axis and operate on the work in a primary plane at right angles to the front of the machine, the position of the primary plane being immaterial provided that the scanning unit is correctly orientated relatively thereto, as described below. When, however, the work to be reproduced, e. g. a turbine blade, has varying sections from root to tip (Figure 18), the grinding wheel will rotate about a vertical axis and will be vertically reciprocated on a short amplitude with means for indexing the grinding wheel to vary the level at which the said reciprocation takes place. When the form to be ground is constituted by a convex curve, the edge of the grinding wheel may be cylindrical, but for concave forms the edge of the wheel will be radiused to a curvature less than that of the form to be reproduced.

As shown in Figures 1 and 2, the machine comprises a fixed base or pedestal A provided inside its upper end with four sets of rollers $A^1$ which cooperate with bearing strips $B^1$ carried beneath a basic slide B. Arranged on the upper surface of the slide B are four further sets of rollers $A^2$ cooperating with bearing strips $C^1$ beneath a main carriage C, the strips $C^1$ being at right angles to the strips $B^1$. The basic slide B and the main carriage C are thus horizontally movable relatively to each other in two mutually perpendicular directions, so that the carriage C is capable of translational movement in all directions relatively to the fixed base A whilst the carriage C always remains parallel to a line fixed in space.

Translational adjustment of the basic slide B and carriage C are effected by feed screws operated by hand wheels $B^2$, $C^2$ respectively lying at the front of the machine so as to be immediately accessible to the operator. The hand wheel $B^2$ is secured to a spindle $B^3$ (Figure 4) journalled in a fixed bracket $A^3$ and having a screwthread $B^4$ engaging an internal screwthread of a sleeve $B^5$ rotatable through a worm $B^6$ and pinion $B^7$ from a reversible split field motor $B^8$, as described below. The basic slide B can thus be adjusted either manually by means of the hand wheel $B^2$ or automatically by means of the motor $B^8$. Similarly, the main carriage C is adjusted by means of a spindle $C^3$ (Figure 5) whose screwthread cooperates with the internal thread of a rotary boss $C^4$ having a worm wheel cooperating with a worm $C^5$ operable by the hand wheel $C^2$. The spindle $C^3$ carries a bearing member having a worm wheel $C^6$ engaged by a worm $C^7$ driven by a second reversible split field motor $C^8$. Thus, whilst the basic slide B can be adjusted in accordance with one coordinate towards and away from the operator either by means of the hand wheel $B^2$ or by means of the motor $B^8$, the main carriage C can be adjusted in accordance with the second coordinate from left to right and vice versa as viewed by the operator by means of the hand wheel $C^2$ or motor $C^8$. The main carriage C is therefore adjustable in all directions horizontally.

Arranged on the main carriage C are the bearings for a work shaft D, a copy shaft E and a checking shaft F, these shafts being indicated by their vertical or longitudinal axes only. The work shaft D carries a work table $D^1$ whilst the copy shaft E carries a copy table $E^1$ and the checking shaft F carries a checking grid. The copy shaft E carries a toothed rim (not shown) engaged by a worm secured to a hand wheel $E^2$ so that the shaft E can be rotated, thereby simultaneously rotating in synchronism all three shafts which are coupled together by flexible bands as shown in Figure 3. The checking shaft F cooperates with a projection screen $F^1$ carried by a portion $A^4$ of the base A, the portion $A^4$ also carrying the guides $G^1$ in which the motor $G^5$ and the grinding wheel G driven thereby can be vertically adjusted. The unit G, $G^2$ is also horizontally adjustable so as to bring the operative edge of the grinding wheel G into alignment with the axis of the work shaft D, this adjustment being facilitated by means of a work microscope $G^2$ carried by a support $G^3$ mounted on the back $A^4$ of the base A.

The parts so far described are as described in the specification of United States of America patent application Serial No. 555,180.

According to the present invention, a scanning unit is disposed within a casing H which can be detachably mounted on locating faces $G^4$ of the fixed bracket $G^3$ is to say the bracket carrying the work microscope $G^2$, and, if desired, adapted to receive the spigot linkage for the generation of circular arcs as described in the specification of United States of America patent application Serial No. 555,180. For this purpose, the casing H of the scanning unit is provided with vertical side or end flanges $H^1$ (Figure 6) whereby the said casing can be firmly secured to the locating faces $G^4$ on the fixed bracket $G^3$.

Arranged within the casing of the scanning unit H is a small synchronous electric motor $H^2$ coupled to a rotary light-chopper $H^3$ (Figures 8 and 9) of the perforated disc type, the chopper $H^3$ rotating across the vertical optical axis O between an electric lamp $H^4$ (Figures 6 and 9) and a thin diaphragm $H^5$ having a rectangular slit-like aperture $H^6$ therein. A condenser lens $H^7$ is so arranged between the lamp $H^4$ and the chopper $H^3$ that the plane of the aperture $H^6$ is uniformly illuminated. Arranged at the lower end of the casing H and in optical alignment with the vertical optical axis O is an objective J which, when the main carriage C is in its zero position, accurately coincides with the axis of rotation of the copy support E, that is to say the support for carrying the copy table and the form to be copied. An intermediate mirror $J^1$ is arranged at an angle of 45° to the optical axis O between the aperture or diaphragm $H^5$ and the objective J, one free edge of this mirror $J^1$, whose lower surface is reflecting, lying on the optical axis O. Thus, since the part of the light from the diaphragm $H^5$ which passes the said edge of the intermediate mirror $J^1$ converges slightly towards the optical axis O below the intermediate mirror $J^1$, this light passes through the objective J so that the slit $H^6$ of the diaphragm $H^5$ is imaged at the object plane X, that is to say the surface $E^3$ of the copy table $E^1$ which is to receive the form to be copied and is rendered light-reflecting. The form to be reproduced is constituted by a photographic transparency K (Figure 10) bearing the opaque form or outline $K^1$, the transparency being arranged face downwards on the reflecting surface $E^3$ of the copy table, i. e. so that the emulsion side of the transparency K contacts with the reflecting surface $E^3$ and both these surfaces lie in the object plane X.

Assuming that the opaque form $K^1$ consists of a curve as in Figure 10, the parts of the machine (when "zero" conditions of equilibrium of the control system as described below are obtained) will be so disposed that the curved form $K^1$ will be tangential to an imaginary line $P^1$ parallel to the primary plane P—P (Figure 2), this line being coincident with the central longitudinal axis $P^1$ of the elongated illuminated area $X^1$ at the object plane X. Thus, since the central longitudinal axis $P^1$ of the slit-like illuminated area $X^1$ at the object plane X is always parallel to the primary plane P—P, the central transverse, or minor, axis $P^2$ (Figures 11 and 12) of the illuminated area $X^1$ will always be accurately normal to the primary plane P—P. Further, the central point $X^2$ of the illuminated area $X^1$ at the object plane X will, under the said conditions of equilibrium, accurately coincide with the point of tangency, as in Figure 11, between the curved form $K^1$ and the line $P^1$ parallel to the primary plane P—P.

Irrespective of its dimensions, the slit $H^6$ will be located so that the edge formed by the intersecting faces of the beam splitter $J^3$ is at right angles to the primary plane P—P. The light beam from the object plane is thus split in a direction parallel to the y axis.

The reflecting surface $E^3$ on the copy table $E^1$, as obscured in part by the opaque form $K^1$, reflects the light back from the illuminated area $X^1$ through the objective J to the lower or reflecting surface of the intermediate mirror $J^1$ which deflects this enlarged image of the illuminated area horizontally on to an adjacent 45° mirror $J^2$ whence the light beam is directed vertically on to a light-splitting or dividing mirror $J^3$. The dividing mirror $J^3$ splits the light beam, from the single illuminated area $X^1$ at the object plane X, into two beams $x^1$ and $y^1$ accurately corresponding respectively to the light derived from the two component areas $a$ and $b$ (Figure 10) lying on opposite sides of the central transverse or minor axis $P^2$ of the illuminated area $X^1$. Thus, for the zero or equilibrium conditions shown in Figure 10, the parts $a^1$, $b^1$ of the two component areas $a$ and $b$ which are obscured by the curved form $K^1$ in the object plane X will be equal to each other so that the amount of light in the two beams $x^1$ and $y^1$ from the light-splitting mirror $J^3$ will also be equal to each other. The two beams $x^1$ and $y^1$ from the light-splitting mirror $J^3$ are directed, through lenses $J^4$, to the cathodes of two photoelectric cells $L^1$, $L^2$ all the parts of the scanning unit so far described, and lying above the transparency K bearing the form $K^1$, being housed as a single integral unit within the casing H of the scanning attachment.

Before describing the manner in which the outputs from the two photoelectric cells $L^1$, $L^2$ are employed to control the movements of the main carriage C, it should be noted that the scanning attachment may be modified as shown in Figures 13 to 16 wherein the intermediate mirror $J^1$ above described is omitted and the chopped light is transmitted from the aperture $H^6$ and objective J through the object plane X to an optical system $M^1$ disposed beneath the plane X. The beam, as obscured in part by the opaque form $K^1$, is thus directed to a light-splitter $M^2$ and thence to the two photoelectric cells $L^1$, $L^2$. These parts are arranged in a casing M furnished with vertical flanges $M^3$ for attachment to faces $G^4$ on the bracket $G^3$ as shown in Figures 13 and 14.

Whichever of the two above arrangements is employed, the photoelectric cells $L^1$, $L^2$, which deliver A. C. signals at the oscillator frequency determined by the light-chopper $H^3$, control the energization of the fields of the motors $B^8$, $C^8$ for adjusting the basic slide B and carriage C respectively, this control being in each case effected both as regards the direction and degree of traverse to be applied to the main carriage C.

As shown in Figure 17, the A. C. voltages developed across the loads $R^1$, $R^2$ of the two cells $L^1$, $L^2$ are applied to two thermionic valves $V_1$, $V_2$ arranged within the casing of the scanning unit (H or M) and used as matching circuits. This arrangement of the two valves $V_1$, $V_2$ in close proximity to the cells $L^1$, $L^2$ facilitates connection to the rest of the control circuit, which is conveniently placed at some distance from the scanning unit (H or M), without introducing undue signal attenuation which might arise if the cell loads were shunted by the low reactance of the connecting leads. The outputs from the valves $V_1$, $V_2$ are amplified at $V_3$, $V_4$ and $V_6$, $V_7$ respectively, the valves $V_3$ and $V_6$ having their anode loads tuned to a carrier frequency to achieve as high a signal-to-noise ratio as possible. The A. C. voltages from the valves $V_4$, $V_7$ are rectified at $V_5$ and $V_8$ and appear as D. C. voltages across load resistances $R_3$, $R_4$ and $R_5$, $R_6$ respectively. The difference between these two D. C. voltages is used to control power valves $V_{11}$, $V_{12}$ which supply current to the centre-tapped field winding of the split field motor $C^8$ described above, this motor giving what will hereinafter be referred to as the "$x$" coordinate or component. The control of the valves $V_{11}$, $V_{12}$ is effected by means of the differential circuit formed by the valves $V_9$, $V_{10}$ the difference between the two control voltages determining the anode voltage of the valve $V_{10}$. Adjustment to the sensitivity of the control circuit can be made without materially altering the state of balance of the currents through the motor field winding $C^9$ (as indicated by the meter $M^4$) by means of the ganged potentiometers $R_4$ and $R_6$.

The mean of the control voltages developed across the resistances $R_3$, $R_4$ and $R_5$, $R_6$ is used to control power valves $V_{15}$ and $V_{16}$ which supply current to the centre-tapped field winding of the control motor $B^8$, this motor giving the y coordinate or component. The control of the valves $V_{15}$, $V_{16}$ is effected by means of valves $V_{13}$ and $V_{14}$ which are connected differentially so that the sensitivity of the control circuit can be adjusted (by means of the ganged potentiometers $R_8$ and $R_9$) without materially altering the state of balance of the currents through the motor field winding $B^9$ as indicated by the meter $M_5$.

The motors $B_8$ and $C_8$ have their armatures separately supplied with direct current through limiting resistances $R_7$. The series networks S, $S_1$ associated with the input circuits of valves $V_9$, $V_{10}$ and $V_{13}$, $V_{14}$ reduce any tendency of the system to oscillate continually.

By means of the circuit as shown in Figure 17, the motors $B_8$ and $C_8$ will develop output torques, whose direction and magnitude will depend upon the direction and magnitude of the control displacements. Thus, assuming that the scanner (H or M) and the form $K^1$ to be reproduced have been adjusted to give the zero or equilibrium conditions as above described with reference to Figure 11, and the copy table $E^1$ is manually rotated so that the original point of tangency $X^2$ moves from the zero position shown in Figure 11 in a direction normal to the primary plane P (that is to say corresponding to the "$x$" directional component), the output of the one cell $L^1$ or $L^2$ will increase whilst the output of the other cell $L^2$ or $L^1$ will decrease, according to the magnitude and direction of the $x$ displacement. The A. C. voltages from the valves $V_4$ and $V_7$ are rectified at $V_5$ and $V_8$ and the difference between the two control voltages determine the anode voltage of the valve $V_{10}$. Thus, the field winding $C^9$ of the motor $C^8$ will be energized in accordance with the difference between the outputs from the two cells $L^1$, $L^2$. Displacement of the opaque form K, $K^1$ so that the original point of tangency $X^2$ moves from the zero position (Figure 11) in a direction parallel to the primary plane P (that is to say corresponding to the "$y$" directional coordinate) results in a corresponding decrease or increase in the output from both the cells $L^1$, $L^2$, according to the direction and magnitude of the $y$ displacement. The mean of the control voltages across $R_3$, $R_4$ and $R_5$, $R_6$ controls the power valves $V_{15}$, $V_{16}$, which supply current to the field winding $B^9$ of the motor $B^8$ for effecting the "$y$" coordinate adjustment.

It will be appreciated that as the carriage C is adjusted in accordance with the $x$ and $y$ directional coordinates the relative movement between the work support D and tool G is a reproduction of the relative movement between the central point $X^2$ of the illuminated area $X^1$ at the object plane X and the opaque form $K^1$, so that though the said point $X^2$ of tangency is displaced as the copy support $E^1$ is turned, this point of tangency $X^2$ will be automatically and continuously restored to the zero position of Figure 11 by the resulting directional coordinate adjustments of the carriage C, the only operation required being the said rotation of the copy support or table $E^1$ by means of the hand wheel $E^2$.

The width of the opaque line $K^1$, representing the form to be reproduced on the work, will be proportional with regard to the characteristics of the optical scanner (H or M) and photoelectric cells $L^1$, $L^2$. Thus, with suitable proportions of the master profile or form $K^1$, and the beam incident on the object plane X, the system can be maintained in equilibrium when the curve of the opaque form $K^1$ is tangential to a plane normal to the primary plane P. Moreover, when a profile to be reproduced suffers a number of changes according to the positions of sections along the length of the part such, for example, as the varying sections $t$ between the root and tip of a turbine blade T (Figure 18), the several sections or forms may be marked or photographically reproduced on one or several transparencies, for example as shown at $t^1$ in Figure 19. When, however, a plurality of sections or forms are carried by a single transparency, the outlines or forms $t^1$ will be suitably deployed in order to guard against interference. For the purpose of ensuring correct relative orientation of the several outlines, the transparency, or the several transparencies, are provided with reference marks Q, $Q^1$ which can be respectively set with respect to the scanner (with the assistance of a suitable meter) and with respect to the origin or basic scale projected on to the reference screen $F^1$ associated with the checking support F. It will be noted from Figure 19 that the axis E of the copy table is offset with respect to the axis O during grinding, this being the optimum condition of the master form $t^1$ at which the control displacements have a minimum value i. e. when the curvature of the form $t^1$ conforms substantially to a radius coaxial with the axis E.

One of the principal advantages of the invention is that the use of a single light beam which is split only after the object plane X has been illuminated renders possible the use of a single optical system and a single light source $H^4$. Further, the control of the carriage C depends upon the ratio of the light and dark areas $a$, $b$ and $a_1$, $b_1$ (Figure 11) of the illuminated area $X^1$ at the object plane X so that the control is "stepless" and equally accurate whatever the direction of displacement of the master profile or form $K^1$ or $t^1$. It should be noted that the forces developed by the two reversible motors $B^8$, $C^8$ will be applied principally in overcoming inertia for acceleration of the basic slide B and carriage C. Thus, displacements from the condition of equilibrium will be proportional to the instantaneous acceleration of the basic slide B and main carriage C.

It will be understood that the constructions more specifically described above are given by way of example only and that details may be modified to suit requirements. For example, though a third or checking support F is advantageous both for initial orientation of the master form or forms $K^1$ or $t^1$ and for checking purposes, the invention may also be employed with two-support machines that is to say in which the carriage C is provided only with a work support D and a copy support E. Further, instead of mounting the main carriage C on a basic slide B, the carriage C may be supported directly on the fixed base A of the machine with the interposition of bearing devices, for example as described in the specification of United States of America patent application Serial No. 660,007. Though termionic control circuits have been described, the output currents controlled by the photoelectric cells $L^1$, $L^2$ may be applied to gas discharge tubes of the Thyratron type. Since the two coordinate readings are continuously available from the machine, these may be applied to an indicator or pen recorder which will thus give an accurate record of the form or profile, for example relatively to a master form after the manner of a graphical comparator.

What we claim as our invention and desire to secure by Letters Patent is:

1. A copying machine comprising a work support, a copy support, a support for a tool which is to operate on the work carried by the work support, a support for a scanning device comprising means which illuminates an area, including part of a sample, pattern, templet or master profile (hereinafter referred to as the "form") to be reproduced and carried by the copy support, means interconnecting the supports whereby relative movement between the tool and work supports in two coordinate directions is a reproduction of the relative movement between the copy support and the support for the scanning device, two photoelectric cells, means whereby the light from said illuminated area is split into two beams incident respectively on the two photoelectric cells, the energisation of the two cells being thus respectively in accordance with the light derived from two component parts of the single illuminated area, and means whereby said cells control the relative movement between the tool and work supports in the two coordinate directions respectively.

2. A copying machine as claimed in claim 1, in which the relative movement between the tool and work supports in one of the two coordinate directions is controlled in accordance with the mean output of the two cells, whilst the relative movement between the tool and work supports in the other coordinate direction is controlled in accordance with the difference between the outputs of the two cells.

3. A copying machine as claimed in claim 1, in which the illuminated area is slit-like with its longitudinal and transverse axes parallel to the two coordinate directions respectively, the two component areas lying on opposite sides of the said transverse axis.

4. A copying machine comprising a work support, a copy support, a support for a tool which is to operate on the work carried by the work support, a scanning device comprising means which illuminates an area in an object plane including part of a sample, pattern, templet or master profile (hereinafter referred to as the "form") to be reproduced and carried by the copy support, a support for said scanning device, means interconnecting the supports whereby relative movement between the tool and work supports in two coordinate directions is a reproduction of the relative movement between the copy support and the support for the scanning device, two photoelectric cells, means whereby the light from said illuminated area is split into two beams derived respectively from two component parts of the said illuminated area and lying on opposite sides of a plane parallel to one of said coordinate directions, means whereby the cells are respectively energised in accordance with the light from said beams, and means whereby the relative movement between the tool and work supports in the two co-ordinate directions is controlled by the photoelectric cells.

5. A copying machine as claimed in claim 4, in which the illuminated area is slit-like with its longitudinal and transverse axes parallel to the two coordinate directions respectively, the two component areas lying on opposite sides of the said transverse axis.

6. A copying machine as claimed in claim 4, in which the illuminated area is slit-like with its longitudinal and transverse axes parallel to the two coordinate directions respectively, the two component areas lying on opposite sides of the said transverse axis.

7. A copying machine as claimed in claim 4, in which the relative movement between the tool and work supports in one of the two coordinate directions is controlled in accordance with the mean output of the two cells, and the relative movement between the tool and work supports in the other coordinate direction is controlled in accordance with the difference between the outputs of the two cells.

8. A copying machine as claimed in claim 4, in which the scanning device comprises a light source, an aperture associated therewith and an objective which images the aperture at the object plane, and a light-deflecting device disposed between the aperture and the objective causes part of the light from the aperture to pass, at a small angle to the optical axis between said aperture and objective, to the objective, the light reflected back from the object plane and through the objective on to the deflecting device being directed thereby to a light-splitting device whereby the light is split into two beams which are incident on the photoelectric cells respectively.

9. A scanning device for a copying machine comprising work and copy supports, a support for a tool which is to operate on the work carried by the work support, a support for said scanning device which scans the outline of a sample, pattern, templet or master profile (hereinafter referred to as the "form") carried by the copy support, and means interconnecting the supports whereby relative movement between the tool and work supports in two coordinate directions is a reproduction of the relative movement between the support for the scanning device and the support for the copy, said scanning device comprising means which illuminates an area in an object plane, means whereby the light from said illuminated area is split into two beams derived respectively from two component parts of the said illuminated area and lying on opposite sides of a median plane through said illuminated area, means whereby the cells are respectively energised in accordance with the light from said beams, and means whereby movement between the tool and work supports in the two co-ordinate directions is controlled by the photo-electric cells.

10. A scanning device as claimed in claim 9, having means which control the relative movements between the tool and work supports, in one of the two coordinate directions, in accordance with the mean output of the two cells, and control the relative movements between the tool and work supports, in the other coordinate direction, in accordance with the difference between the outputs of the two cells.

11. A scanning device as claimed in claim 9, in which the scanning device illuminates a slit-like area, and the two component parts of the illuminated area lie on opposite sides respectively of the central minor axis of said area.

12. A scanning device as claimed in claim 9, having a diaphragm having an aperture therein, an objective which images the aperture at the object plane, and a light-deflecting device disposed between the aperture and the objective, part of the light from the aperture passing the deflecting device, at a small angle to the optical axis between said aperture and objective, to the objective and thence to the object plane, the light reflected back from the object plane and through the objective on to the deflecting device being directed thereby to a light-splitting device which splits the light into two beams incident upon the photoelectric cells respectively.

13. A copying machine comprising a work support, a copy support, a support for a tool which is to operate on the work carried by the work support, a scanning device comprising means which illuminates an area in an object plane including part of a sample, pattern, templet or master profile to be reproduced and carried by the copy support, a support for said scanning device, means interconnecting the supports whereby relative movement between the tool and work supports in two coordinate directions is a reproduction of the relative movement between the copy support and the support for the scanning device, two photoelectric cells, means whereby light derived by transmission through the object plane and through the two component parts of the illuminated area is split into two beams derived respectively from two component parts of the said illuminated area and lying on opposite sides of a plane parallel to one of the said coordinate directions, means whereby the cells are respectively energised in accordance with the light from said beams, and means whereby the relative movement between the tool and work supports in the two coordinate directions is controlled by the two photoelectric cells.

14. A copying machine comprising a work support, a copy support, a support for a tool which is to operate on the work carried by the work support, a scanning device comprising means which illuminates an area in an object plane including part of a sample, pattern, templet or master profile to be reproduced and carried by the copy support, a support for said scanning device, means interconnecting the supports whereby relative movement between the tool and work supports in two coordinate directions is a reproduction of the relative movement between the copy support and the support for the scanning device, two photoelectric cells, means whereby light derived by reflection from the two component parts of the illuminated area in the object plane is split into two beams derived respectively from two component parts of the said illuminated area and lying on opposite sides of a plane parallel to one of the said coordinate directions, means whereby the cells are respectively energised in accordance with the light from said beams, and means whereby the relative movement between the tool and work supports in the two coordinate directions is controlled by the two photoelectric cells.

ERNEST ALBERT COOKE.
ALAN HENRY GREENHALGH.

REFERENCES CITED

The following references are of record in the file of this patent:

UNITED STATES PATENTS

| Number | Name | Date |
|---|---|---|
| 2,116,593 | Bouvier et al. | May 10, 1938 |
| 2,121,211 | Padva et al. | June 21, 1938 |
| 2,125,074 | Long | July 26, 1938 |
| 2,225,915 | Losier | Dec. 24, 1940 |
| 2,331,337 | Meyer | Oct. 12, 1943 |

FOREIGN PATENTS

| Number | Country | Date |
|---|---|---|
| 500,104 | Great Britain | Jan. 26, 1939 |